United States Patent [19]

Busch

[11] 4,279,768

[45] Jul. 21, 1981

[54] SERVICE DESCALER FOR AQUEOUS SYSTEMS

[75] Inventor: Bruce D. Busch, Shakopee, Minn.

[73] Assignee: Fremont Industries, Inc., Shakopee, Minn.

[21] Appl. No.: 117,952

[22] Filed: Feb. 4, 1980

[51] Int. Cl.³ .............................................. C02F 5/10
[52] U.S. Cl. .................................. 252/180; 252/175; 252/80; 252/81; 210/701
[58] Field of Search ................... 252/180, 175, 81, 80; 210/58, 701

[56] References Cited

U.S. PATENT DOCUMENTS

| | | | |
|---|---|---|---|
| 3,463,730 | 8/1969 | Booth et al. ...................... | 252/180 X |
| 3,956,164 | 5/1976 | Walker et al. ...................... | 252/180 |
| 3,962,109 | 6/1976 | Oberhofer et al. ............... | 252/180 X |
| 4,072,607 | 2/1978 | Schiller et al. ................... | 252/180 X |

FOREIGN PATENT DOCUMENTS 1414918  11/1975  United Kingdom ...................... 210/58

Primary Examiner—Mayer Weinblatt
Attorney, Agent, or Firm—Orrin M. Haugen; Thomas J. Nikolai

[57] ABSTRACT

A scale removing formulation designed to remove scale build-up on metallic working surfaces, the scale being conventional and composed of calcium salts and iron oxides from aqueous systems such as boilers, cooling towers, heat exchangers, and the like, while those systems are in service. The present invention utilizes a synergistic blend of a chelant, polymeric conditioners and a gluconate. Principle components of the formulation of the invention include a chelant, polymeric conditioners, a gluconate, a triazole, and sodium sulfite. The gluconate is utilized as an inhibitor for ferrous metal surfaces, with the triazole being utilized as an inhibitor for non-ferrous metal surfaces. The sodium sulfite is employed for removal of dissolved oxygen.

3 Claims, No Drawings

SERVICE DESCALER FOR AQUEOUS SYSTEMS

BACKGROUND OF THE INVENTION

Water utilization and containing systems such as boilers, cooling towers and heat exchangers are notoriously susceptible to scale build-up and formation due to the presence of impurities in the water. Such impurities are normally the water hardening compounds, such as the various calcium salts and iron oxide found in most water supplies, domestic and commercial. Scale build-up on heat transfer surfaces in the aforementioned equipment causes much expense to the owner as well as possible exposure to dangerous conditions for those persons located near such equipment. Scale build-up decreases the rate of heat transfer through the surfaces, and hence contributes to an overall loss of efficiency as well as increased energy costs. Scaled heat transfer surfaces are susceptible to corrosion beneath the scaled area since corrosion control agents are unable to effectively contact the metal surface. Furthermore, scale acts as an insulator, resulting in inefficient heat transfer. This condition leads to both increased fuel costs and decreased system efficiency. System component failures can occur due to the higher than normal temperatures at the heat transfer surfaces. Repair costs of component failures include labor, replacement parts cost, and plant downtime. Experience has shown that the use of sophisticated water pre-treatment techniques or careful chemical treatment do not always preclude the possibility of scale formation.

The primary components of most water impurity caused scales in the equipment mentioned above are calcium salts (e.g. calcium carbonate, calcium orthophosphate, calcium sulfate and calcium bicarbonate) and iron oxides. These compounds are present in most domestic and commercial water supplies, having been found both in surface and subterranean water sources.

The present state of the art scale prevention includes the use of chelants, polymeric conditioners and gluconates as sequestering agents. Chelants such as tetrasodium ethylene diamine tetra acetic acid (EDTA) and trisodium nitrilotriacetate (NTA) stoichiometrically sequester calcium and iron ions. Stoichiometric treatments require significant concentrations to prevent scale formation, particularly when the water source contains substantial quantities of calcium and iron ions. Gluconates and polyelectrolytes are normally threshold treatments. Threshold treatments are generally effective in controlling large numbers of ions per unit of treatment, and the economy of using such threshold treatments is readily apparent.

Scale removal is normally accomplished by descaling with acid treatments. Organic acids such as citric and sulfamic or mineral acids such as hydrochloric are frequently used to remove scale of the type mentioned above. However, in acid descaling, the system must be shut down, drained, acid cleaned, rinsed, drained and retreated. Acid descaling thus requires either waiting for a convenient time to shut down operations or possibly interrupting production schedules on an emergency basis to achieve cleaning. Either alternative is known to be costly. Since draining of the system is often required, an added cost is the replenishing of chemical treatment of the water, once the system is clean.

The purpose of the present invention is to offer an alternative method of descaling. The descaling accomplished by the formulation of the present invention occurs while the system is in operation. No system shut-down or draining are necessary when using the formulation of the present invention. The formulation dissolves and chelates calcium scales and iron oxides from scale which has formed on the heat transfer surfaces of the system while the system remains in operation. The operation accordingly is achieved in an economic fashion.

The present invention is a synergistic blend of a chelant, organic polymer conditioners, and a gluconate which combine to effectively dissolve scale components. the chelants used (EDTA or NTA) are not economical for scale removal when used alone because of their stoichiometric reaction mode. The other components, polymers and gluconate, when used alone, do not effectively remove scale. The synergistic effect of the combined ingredients in the present invention enables effective and economical removal of scale while the system remains operational. The chelants selected were EDTA and NTA because of their high efficiency in the formulation, as well as their commercial availability and low cost. A low molecular weight anionic organic polyelectrolyte was selected for incorporation because of its anti-scaling properties. These polymers have been found to hamper the formation of crystal lattice structures of scale components by altering those structures. A medium molecular weight anionic organic polyelectrolyte was selected for its properties as a dispersing agent in the formulation. These agents, when present in the present formulation, cause a suspension of ions thus preventing scale formation, and also serve to disperse any nondissolvable scale components freed from the scale upon dissolution of the primary scale components.

Sodium gluconate is incorporated in the formulation of the present invention because of its sequestering properties and its inhibition of corrosion of ferrous metal surfaces. Benzotriazole performs the function of inhibition of corrosion of non-ferrous metal surfaces. This component is desirable in systems containing copper components. Sodium sulfite is included in the formulation of the present invention for the removal of dissolved oxygen. The clean and bare surface of the metal in the system, particularly heat transfer surfaces, following scale removal is highly susceptible to corrosion from oxygen pitting and chelant attack. For this reason, corrosion inhibitors and an oxygen scavenger have been found beneficial.

SUMMARY OF THE INVENTION

Therefore, it is a primary object of the present invention to provide a formulation which is effective in the in-service descaling of water containing systems, such as heat transfer surfaces found in hot water and steam boilers, as well as other water-containing systems.

It is a further object of the present invention to provide an improved formulation for the removal of scale from heat transfer surfaces, such as boilers and the like, with the scale removal being accomplished while the systems continue in operation.

It is yet a further object of the present invention to provide an improved formulation for the effective prevention of re-deposition of removed scale components from a heat transfer surface through the effective sequestering of the same.

It is yet a further object of the present invention to provide an improved in-service descaler for heat transfer surfaces, wherein the formulation provides protection of both ferrous and non-ferrous metal surfaces from corrosion.

It is yet a further object of the present invention to provide an improved formulation for the in-service descaling of heat transfer surfaces, wherein the descaling is achieved without risk of corrosion to exposed metal surfaces.

It is yet a further object of the present invention to provide for the rapid, efficient, and effective dispersion of removed scale through the decomposition of the primary scale components.

Other and further objects of the present invention will become apparent to those skilled in the art upon a study of the following specification and appended claims.

DESCRIPTION OF THE PREFERRED EMBODIMENT

In order to best disclose the properties of the preferred embodiment, the following specific formulation is provided:

| Component | Percent by Weight |
|---|---|
| Chelant (tetrasodium ethylene diamine tetra-acetic acid, 40% by weight aqueous solution, commercially available) | 20.0 |
| Antiprecipitant/Dispersant (an anionic organic polyelectrolyte (polyacrylamide having a molecular weight of about 8000) available commercially as "Liquid Cyanamer P-35" from American Cyanamid Company Industrial Chemicals Division of Wayne, New Jersey) | 0.50 |
| Antiprecipitant (the anionic organic polyelectrolyte (polyacrylamide having a molecular weight of about 1000) available commercially as "Liquid Cyanamer P-70" from American Cyanamid Company Industrial Chemicals Division of Wayne, New Jersey) | 0.50 |
| Non-ferrous metal corrosion inhibitor (benzotriazole, available commercially as "Cobratec 99" from Sherwin Williams Company of New York, New York) | 0.20 |
| Ferrous metal corrosion inhibitor (sodium gluconate commercially available) | 2.00 |
| Oxygen scavenger (sodium sulfite commercially available) | 3.00 |
| Water | 73.8 |

In order to provide a variety of related formulations, the following table is presented as related to the preferred embodiment wherein the ranges of the components is set forth hereinbelow:

TABLE I

| Component | Percent by Weight In Formulation |
|---|---|
| Tetrasodium ethylene diamine tetra acetic acid, 40% by weight aqueous solution (commercially available) | 5.0 to 40.0 |
| Antiprecipitant/Dispersant (an anionic organic polyelectrolyte (polyacrylamide having a molecular weight of about 8000) available commercially as "Liquid Cyanamer P-35" from American Cyanamid Company Industrial Chemicals Division of Wayne, New Jersey) | 0.1 to 5.0 |
| Antiprecipitant (the anionic organic polyelectrolyte (polyacrylamide having a molecular weight of about 1000) available commercially as "Liquid Cyanamer P-70" from American Cyanamid Company Industrial Chemicals Division of Wayne, New Jersey) | 0.1 to 5.0 |
| Non-ferrous metal corrosion inhibitor (benzotriazole, available commercially as "Cobratec 99" from Sherwin Williams Company of New York, New York) | 0.0 to 2.0 |
| Ferrous metal corrosion inhibitor (sodium gluconate commercially available) | 1.0 to 10.0 |
| Oxygen scavenger (sodium sulfite commercially available) | 0.0 to 10.0 |
| Water | balance |

Discussion of the Individual Components

Each component of the present invention provides specific functions in the working solution. These components and advantages are discussed below.

(A) Chelant

Tetrasodium ethylene diamine tetra acetic acid is the preferred chelant although it has been found that trisodium nitrilotriacetate, monohydrate may be used effectively on a 1:1 substituted basis. The 40% by weight aqueous solution of tetrasodium ethylene diamine tetra acetic acid was selected because of its chelating ability for calcium, magnesium and iron ions, its ease of blending into the formulation of the invention, and its commercial availability. The anhydrous powder of the preferred chelant may also be used successfully in the formulation of the present invention.

(B) Antiprecipitant

Polyacrylamide having a molecular weight of about 1000 has been found most preferable in this application. Such materials are commercially available under the code name "Liquid Cyanamer P-70" from American Cyanamid Company of Wayne, N.J. This component was selected as the preferred antiprecipitant because of its crystal modifying properties on the crystal lattices of calcium carbonate and its synergistic effect when used in conjunction with the preferred chelant.

(C) Antiprecipitant/Dispersant

Polyacrylamide having a molecular weight of about 8000 is the preferred component, with this material being available commercially under the code name "Liquid Cyanamer P-35" from American Cyanamid Company of Wayne, N.J. This component was selected for use in the formulations of the present invention because of its ability to modify crystal lattices of calcium carbonate and its ability to disperse effectively those particulates which do not go into solution when exposed to the working aqueous solutions of the formulations of the present invention. The synergistic effect when used with the preferred chelant of the present formulation is also of importance.

(D) Non-Ferrous Metal Corrosion Inhibitor

Benzotriazole is the preferred copper corrosion inhibitor. This component has been used in state-of-the-art copper corrosion preventatives effectively for years. The presence of benzotriazole is regarded as important inasmuch as the chelants may adversely affect the surfaces of certain non-ferrous metals, particularly copper. This component is, of course, not required in those applications where there are no non-ferrous metal surfaces present, however for ease of production and universal application, and also for purposes of guarding against inadvertent or unexpected presence of non-ferrous metal surfaces, this component is included in the formulations.

(E) Ferrous Metal Corrosion Inhibitor

Sodium gluconate is the preferred ferrous metal corrosion inhibitor due to its synergistic effect when used in conjunction with the preferred chelant and preferred polyelectrolytes as well as for its characteristics as a corrosion inhibitor and sequestrant. It has been found that the presence of sodium gluconate provides an unexpected synergism in the removal of scale, particularly when combined with the other components of the system.

(F) Oxygen Scavenger

Sodium sulfite has been used effectively for the removal of dissolved oxygen and is therefore chosen as the preferred oxygen scavenger. An oxygen scavenger is desired whenever a closed system is employed, since the removal of dissolved oxygen assists in the protection of the metallic surfaces.

The present invention deals with a synergistic effect allowing increased efficiency of scale dissolution by the chelant. Experiments were performed to ascertain the possibility of descaling with chelants. A synergism was discovered which lowers the amount of treatment necessary to remove scale. Subsequently, the chelating power of several formulations was investigated. A description of the tests completed and conclusions drawn from the results of those tests follow:

TEST FORMULATIONS

A.
  1000 grams distilled water
  200 grams EDTA, 40% aqueous solution
B.
  1000 grams distilled water
  5 grams polyacrylamide, molecular weight 8000
  5 grams polyacrylamide, molecular weight 1000
C.
  1000 grams distilled water
  200 grams EDTA, 40% aqueous solution
  5 grams polyacrylamide, molecular weight 8000
  5 grams polyacrylamide, molecular weight 1000
D. 1000 grams distilled water
  20 grams sodium gluconate
E.
  1000 grams distilled water
  200 grams EDTA, 40% aqueous solution
  20 grams sodium gluconate
  5 grams polyacrylamide, molecular weight 8000
  5 grams polyacrylamide, molecular weight 1000

Test 1

To each of a series of containers of 1000 milliliters of distilled water there was added 1 gram of calcium carbonate powder, with agitation being supplied by a magnetic stirrer. 1000 milliliters of each one of the test solutions was added to one such container and a conductivity reading was taken. This was recorded as $C_0$. The change in conductivity was recorded as $\Delta C_5$, $\Delta C_{10}$, $\Delta C_{15}$, $\Delta C_{20}$, $\Delta C_{25}$ and $\Delta C_{30}$. One additional gram of calcium carbonate powder was added and the conductivity change was recorded at ten minute intervals. These values were recorded as $\Delta C_{40}$, $\Delta C_{50}$ and $\Delta C_{60}$. The test was also run without the addition of any solutions and recorded as a control. Table 1 contains the results obtained from this experiment.

TABLE I

| | Conductivity Values are recorded in micromhos | | | | | | | | | |
|---|---|---|---|---|---|---|---|---|---|---|
| Test Formulation | $C_0$ | $\Delta C_5$ $(C_5-C_0)$ | $\Delta C_{10}$ $(C_{10}-C_0)$ | $\Delta C_{15}$ $(C_{15}-C_0)$ | $\Delta C_{20}$ $(C_{20}-C_0)$ | $\Delta C_{25}$ $(C_{25}-C_0)$ | $\Delta C_{30}$ $(C_{30}-C_0)$ | $\Delta C_{40}$ $(C_{40}-C_0)$ | $\Delta C_{50}$ $(C_{50}-C_0)$ | $\Delta C_{60}$ $(C_{60}-C_0)$ |
| A | 3100 | 200 | 300 | 350 | 400 | 400 | 400 | 600 | 600 | 600 |
| B | -0- | 1100 | 1100 | 1100 | 1100 | 1100 | 1100 | 1100 | 1100 | 1100 |
| C | 3300 | 200 | 300 | 300 | 400 | 400 | 400 | 600 | 600 | 600 |
| D | 400 | -0- | -0- | -0- | -0- | 10 | 10 | 10 | 10 | 10 |
| E | 3300 | 400 | 500 | 500 | 520 | 550 | 550 | 750 | 800 | 800 |
| Control | -0- | -0- | -0- | -0- | -0- | -0- | -0- | -0- | -0- | -0- |

Test 2

1000 milliliters of hard water (250 mg/l total hardness) was titrated using Calmagite, an organic dye indicator and the test formulations as titrants. The test formulations were added dropwise until the end point was reached. At the end point, the indicator color changes from red to blue signaling the chelation of all hardness. Table II contains the results obtained from this experiment.

TABLE II

| Titrant test formulation | Drops used to reach end point (15 drops = 1 milliliter) |
|---|---|
| A | 280 |
| B | 500 drops - no end point |
| C | 215 |
| D | 500 drops - no end point |
| E | 196 |

Interpretation of Results of Experiments Performed

Test 1: Conductivity Change Influence by Test Formulations

Conductivity measurements reflect the number of ions present in the aqueous solution. Since undissolved solids are not ionized, they do not influence conductivity measurements. The control test run in this experiment verifies that the undissolved calcium carbonate powder does not influence the conductivity measurement. The control also shows that the solubility of calcium carbonate did not change during the time period of the experiment. It is concluded that any increase in solubility of calcium carbonate over the duration of the experiment may be attributed to the test formulation added.

Test formulation A contained the preferred chelant and distilled water. A conductivity change was recorded signifying the dissolving of calcium carbonate powder by the test formulation. The fact that the flask was clear at the end of 30 minutes (before the addition of the second gram of calcium carbonate) adds a visual confirmation to the dissolution.

Test formulation B contained distilled water and the preferred polyelectrolytes. A change in conductivity was noted after 5 minutes but no further change in conductivity took place. The slow dissociation of the polyelectrolytes into ions would appear to account for this change. No visual dissolution of calcium carbonate was detected. Test formulation B was therefore considered to have no effect on the solubilization of calcium carbonate powder.

Test formulation C contained distilled water, the preferred chelant and the preferred polyelectrolytes. The conductivity change recorded was essentially the same as observed for test formulation A. It should be noted that the concentration by weight of the chelant was slightly less in Test formulation C than in Test formulation A, yet the net conductivity changes were equal. This indicates that either there was a slight synergism in effect or that the experiment is not sensitive enough to detect the effect of a slight difference in chelant concentration.

Test formulation D contained distilled water and the preferred gluconate; sodium gluconate. Only a very slight difference in conductivity was noted indicating that sodium gluconate does not effectively solublize calcum carbonate powder.

Test formulation E contained distilled water, the preferred chelant, sodium gluconate, and the preferred polyelectrolytes. An increase in the net conductivity change over Test formulations A and C was observed at all time intervals. After 5 minutes duration, the net conductivity change ($\Delta C_5$) for Test formulation E was 100% higher than for Test formulations A and C. After 30 minutes duration, before the addition of the second gram of calcium carbonate powder, the $\Delta C_{30}$ for Test formulation E was 37.5% greater than for Test formulations A and C. Following the addition of the second gram of calcium carbonate powder and an additional 30 minutes mixing time, the $\Delta C_{60}$ for Test formulation E was $33\frac{1}{3}$% greater than for Test formulations A and C.

The increase in net conductivity change observed for Test formulation E over Test formulations A and C, together with the data indicating that the preferred polyelectrolytes and the sodium gluconate components when tested separately, had negligible if any effect on the change in conductivity of the solution, definitely indicates synergism between the sodium gluconate, preferred polyelectrolytes and the preferred chelant. This synergism is considered responsible for the increased efficiency in the dissolving of calcium carbonate.

Test II: Chelation potential influence by the addition of sodium gluconate and/or the preferred polyelectrolytes to the preferred chelant The observation of the end point in this experiment indicates that the hardness in the water is essentially 100% chelated by the test formulation titrant. The data indicates that Test formulation B containing distilled water and the preferred polyelectrolytes and Test formulation D containing distilled water and sodium gluconate are ineffective in chelating hardness to the end point at 500 drops usage. Any significant increase in chelating power found when introducing the preferred polyelectrolytes or the sodium gluconate as additives over the chelating power of the chelant alone is evidence of a synergistic effect between the additives and the chelant. Comparison of the results obtained from Test formulations A, C and E confirms the synergism between the preferred chelant and the additives used. The chelating ability of the preferred chelant is enhanced by 23% upon the addition of the preferred polyelectrolytes at minimal levels. The chelating power of the preferred chelant was increased by 30% upon the addition of both sodium gluconate and the preferred polyelectrolytes. This synergistic effect is of increasing importance due to the necessity of maintaining the dissolved calcium carbonate in solution. The experiment clearly shows that the present invention is more capable of chelating the dissolved scale components than is the chelant when used alone.

The advantages of the synergistic effect described above as well as the relationship to the present invention is apparent.

Use of the Present Invention

One of the primary advantages of the present invention is the ability to achieve maximum results with minimal dosages while the system continues to operate. The most common method of introduction of the invention into the water containing system is simply the mixing of the present invention with the other chemical treatments being used. If no other chemical treatments are to be used, or if incompatibilities exist between the present invention and the concentrated form of the other products in use, then the present invention may be introduced to the system at any location where the formulation will be quickly and efficiently mixed with the water of the system. One useful technique for introduction of the formulation to the system water is through the use of an injector. Typically, injectors may be calibrated so as to deliver a predetermined proportion of the formulation to the make-up water.

The formulations of the present invention have proven useful in the removal of scale in systems such as those described hereinabove. Required dosage of the formulation will of course vary depending on conditions within the system, including the condition of the make-up water. The formulations of the present invention have been used effectively at dosages between 1 part of the formulation and 1000 to 5000 parts system water.

I claim:

1. An in-service descaler for heat transfer surfaces consisting essentially of a composition having the following formulation:

| Component | Percent by Weight |
| --- | --- |
| A chelating agent selected from the group consisting of tetrasodium ethylene diamine tetra acetic acid and tetrasodium nitrotriacetate monohydrate and mixtures thereof based upon a 40% aqueous solution | 5.0 to 40.0 |
| Polyacrylamide having a molecular weight of about 8000 | 0.1 to 5.0 |
| Polyacrylamide having a molecular weight of about 1000 | 0.1 to 5.0 |
| Benzotriazole | 0 to 2.0 |
| Sodium gluconate | 1.0 to 10 |
| Sodium sulfite | 0.0 to 10 |

| Component | Percent by Weight |
|---|---|
| Water | balance | wherein said formulation is present in an aqueous solution in a range from between about 1 part to 1000 to 5000 parts of system water.

2. The composition as defined in claim 1 wherein said chelating agent is tetrasodium ethylene diamine tetra acetic acid.

3. The composition as defined in claim 2 wherein said composition has the formulation:

| Component | Percent by Weight |
|---|---|
| A chelating agent selected from the group consisting of tetrasodium ethylene diamine tetra acetic acid and tetrasodium nitrotriacetate monohydrate and mixtures thereof based upon a 40% aqueous solution | 20.0 |
| Polyacrylamide having a molecular weight of about 8000 | 0.50 |
| Polyacrylamide having a molecular weight of about 1000 | 0.50 |
| Benzotriazole | 0.20 |
| Sodium gluconate | 2.00 |
| Sodium sulfite | 3.00 |
| Water | balance |

* * * * *